No. 680,630. Patented Aug. 13, 1901.
N. J. WILLIAMS & W. S. HILL.
PROCESS OF CURING AND DRYING FISH.
(Application filed Aug. 1, 1899.)
(No Model.)
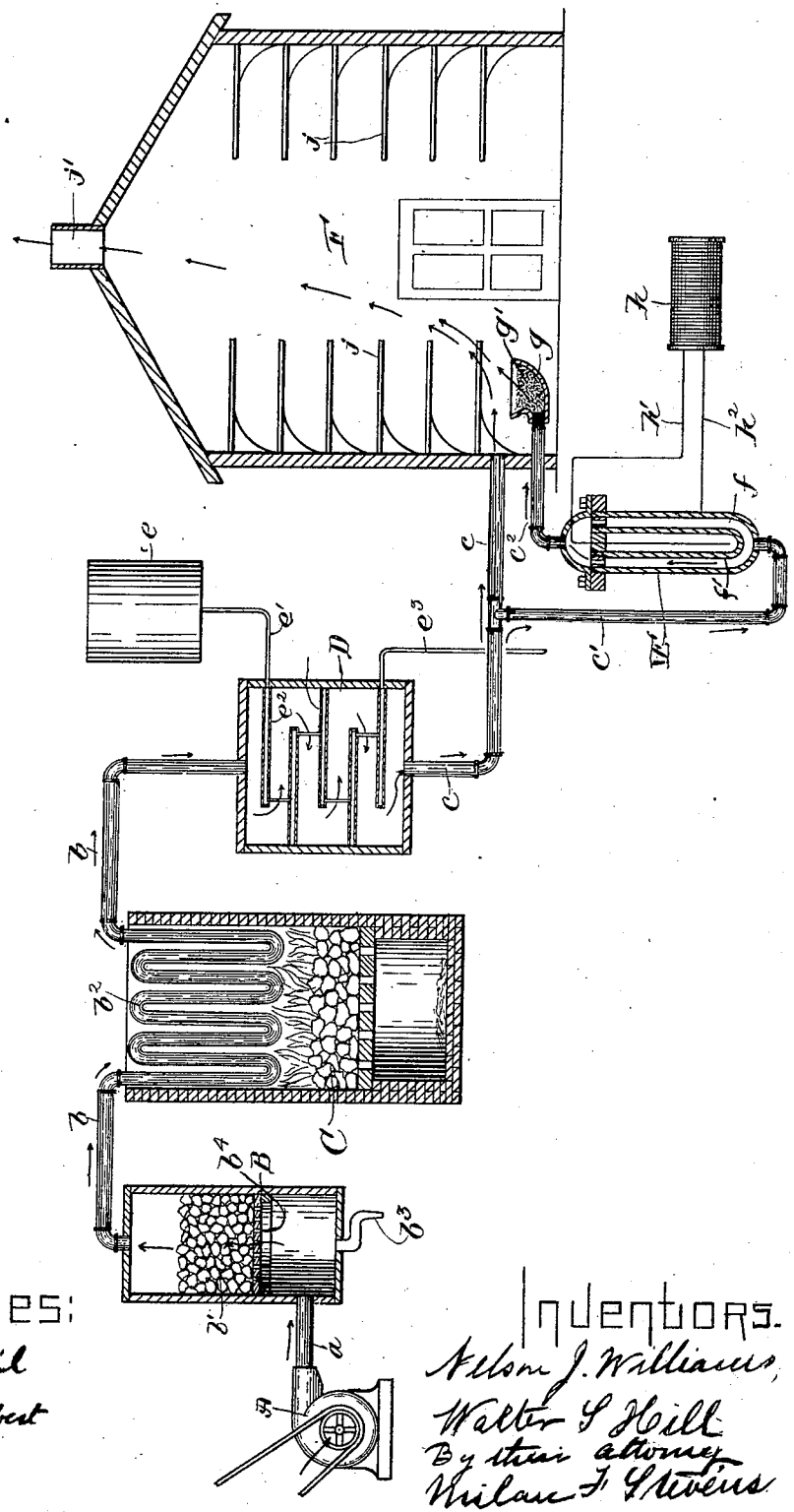

UNITED STATES PATENT OFFICE.

NELSON J. WILLIAMS, OF MALDEN, AND WALTER S. HILL, OF WINTHROP, MASSACHUSETTS.

PROCESS OF CURING AND DRYING FISH.

SPECIFICATION forming part of Letters Patent No. 680,630, dated August 13, 1901.

Application filed August 1, 1899. Serial No. 725,814. (No specimens.)

*To all whom it may concern:*

Be it known that we, NELSON J. WILLIAMS, a subject of the Queen of England, residing at Malden, in the county of Middlesex, and WALTER S. HILL, a citizen of the United States, residing at Winthrop, in the county of Suffolk, Commonwealth of Massachusetts, have invented certain new and useful Improvements in Curing and Drying Fish and the Like, of which the following, taken in connection with the accompanying drawings, is a specification.

This invention relates to a new method of treating wet salted fish and the like, whereby the fish may be dried in a shorter time than heretofore, the moisture contained therein may be removed, and the appearance and flavor of the fish may be improved. Heretofore such salted fish were most effectually dried before shipment to foreign countries by exposure to the atmospheric air, which in climates where the process has been practiced will rapidly change from warm to cold, and in these alternating currents of warm and cold air the fish was after a great length of time finally in a reasonable condition for transportation, yet there was no absolute exactness obtainable as to results and much time was lost in following the slow methods of nature. By our invention the work can be done in about four hours. Different customers in some countries to which such fish is exported desire to have different quantities of moisture eliminated from the fish. By our invention the exact quantity of moisture desired can be eliminated. Under the old methods, owing to the development of bacteria or germs in the fish and in the atmosphere surrounding the fish, the result was a dark product, alike unattractive to the eye and the taste. These bacteria or micro-organisms being always present, both in the atmosphere and on the surface of the fish, multiplied rapidly while drying, particularly in a warm temperature, thereby causing the dark color usually observed. By our invention the product can be made of a white color, entirely freed from bacteria or germs, and of a superior flavor.

Various experiments in curing and drying fish have hitherto been made by supporting the fish within a body of air confined at its sides and bottom and treating the fish with alternate currents of hot and cold air; but while such experiments have succeeded in reducing the time of drying the fish and in eliminating the moisture therefrom, still they have failed to destroy the bacteria or germs in the fish and in the atmosphere surrounding the fish or to improve the color, quality, and flavor of the fish. By our invention a current of air is dehydrated, then sterilized, then ozonated, and then forced in over and about the fish while the fish is being supported within a body of air confined at its sides and bottom, thereby thoroughly drying the fish, sterilizing it, bleaching it to a white color, and producing in the body of the fish a superior fishy flavor by the application of ozone or other antiseptic to the fish.

In the accompanying drawing the letters A represent a blower. $a$ is a circulating-pipe connected therewith.

B is a dehydrating-compartment. $a$ and $b$ are circulating-pipes connected therewith. $b'$ is a quantity of chlorid of calcium in lumps contained therein.

$b^4$ is a grate, and $b^3$ is an outlet contained therein.

C is a sterilizing-furnace.

$b^2$ is a coil of circulating-pipe connected with pipe $b$.

D is a cooling apparatus, and $b$ and $c$ are circulating-pipes connected therewith.

$e^2$ is a coil of water-pipe traversing D and connected with pipe $e'$ and the outlet $e^3$.

$e$ is a water-tank connected with pipe $e'$.

E is an ozonizing apparatus consisting of two glass tubes, one, $f$, being charged positively and the other one, $f'$, negatively and being placed one within the other, so as to have an annular space between them.

$h'$ and $h^2$ are wires connected with $f$ and $f'$.

$c'$ is a circulating-pipe connecting apparatus E with pipe $c$.

$c^2$ is a circulating-pipe connecting apparatus E with $g$.

$g$ is a denitrating-receptacle containing a quantity of soda $g'$, which receptacle $g$ may be used, if desired, in connection with apparatus E.

$h$ is an induction-coil connected by wires $h'$ and $h^2$ with $f$ and $f'$, respectively.

F is a casing connected with pipes $c$ and $c^2$ and the outlet $j'$, and $j$ and $j$ are trays for holding fish and being supported in the casing F.

If the air should be particularly dusty or smoky, it may be filtered by drawing it through cotton before entering the blower A. Again, in place of the sterilizing-furnace C for heating the coil of circulating-pipe $b^2$ a cylinder containing the coil of pipe $b^2$ may be connected with a source of steam-heat, which will be just as effectual as direct fire.

The following is a correct method of operating our invention: The wet salted fish is first spread out on trays $j$ and $j$, generally arranged in rows and supported in the casing F. The blower A is now set in motion and a current of air is forced through the circulating-pipe $a$ into the dehydrating-compartment B, where it passes through the grating $b^4$ and the chlorid of calcium in lumps $b'$, thereby eliminating the moisture therefrom and causing it to collect and flow from the outlet $b^3$. Thence the current of air is forced through the circulating-pipe $b$, connected with the top of B, into the coil of pipe $b^2$, traversing the furnace C, wherein the temperature which the fire in the furnace C should impart to the coil of pipe $b^2$ should be about 212° to 250° Fahrenheit, thereby destroying the bacteria or germs contained in the air passing through the coil of pipe $b^2$. Thence the current of air is forced through a continuation of the circulating-pipe $b$ into the cooling apparatus D, traversed by the coil of circulating-pipe $e^2$, connected by pipe $e'$ with the water-tank $e$ and with the outlet $e^3$, wherein the temperature which the water passing from the water-tank $e$ through the circulating-pipes $e'$ and $e^2$ to the outlet $e^3$ should impart to the air contained in D should be about 60° Fahrenheit, thereby lowering the temperature of the air contained in D to such a degree that the current of air will thoroughly dry the fish, but not cook it. Thence the current of air is forced into the circulating-pipe $c$ and passes into the casing F. A small portion of the current of air contained in pipe $c$ is diverted into the circulating-pipe $c'$ and passes into the ozonizing apparatus E, where the air is in part converted into ozone by means of the induction-wires $h'$ and $h^2$ and passes through the circulating-pipe $c^2$ and over a quantity of soda $g'$, contained in the denitrating-receptacle $g$ into the casing F. The currents of the dehydrated and sterilized air and ozone contained in the casing F unite and pass in, over, and about the fish, thereby thoroughly drying the fish, sterilizing the same, changing its color from dark to white, and improving its flavor. While the process of drying the fish is going on the moisture evaporated therefrom and the currents of air and ozone after passing around the fish rise and pass out of the opening $j'$, situated in the top of the casing F. The process of drying the fish is continued for about four hours, when it is completed and the fish is ready for transportation and in a good condition to keep fresh and wholesome for an indefinite period.

Having fully described our invention, what we claim is—

The improved process of drying and curing fish, which consists in salting the fish, dehydrating and sterilizing air, ozonating said air, and exposing the moist salted fish to a constantly-renewing current of the said ozonated and sterilized air, until the required degree of drying and curing has been secured, substantially as and for the purposes set forth.

In testimony whereof we have signed our names to this specification, in the presence of two subscribing witnesses, on this 24th day of July, A. D. 1899.

NELSON J. WILLIAMS.
WALTER S. HILL.

Witnesses:
GEORGE W. GILBERT,
MILAN F. STEVENS.